United States Patent
Kirsch

(10) Patent No.: US 11,497,279 B2
(45) Date of Patent: Nov. 15, 2022

(54) LINKED SHOOTING BELT

(71) Applicant: Double-Alpha Academy B.V., Waalwijk (NL)

(72) Inventor: Saul J. Kirsch, Waalwijk (NL)

( * ) Notice: Subject to any disclaimer, the term of this patent is extended or adjusted under 35 U.S.C. 154(b) by 60 days.

(21) Appl. No.: 17/177,651

(22) Filed: Feb. 17, 2021

(65) Prior Publication Data
US 2022/0256981 A1    Aug. 18, 2022

(51) Int. Cl.
*A44B 11/25* (2006.01)
*F41C 33/04* (2006.01)
*F16G 3/02* (2006.01)

(52) U.S. Cl.
CPC .......... *A44B 11/2584* (2013.01); *F16G 3/02* (2013.01); *F41C 33/046* (2013.01)

(58) Field of Classification Search
CPC ............. Y10T 24/4782; Y10T 24/4736; Y10T 24/2593; Y10T 24/2596; Y10T 24/266; A44C 5/00; A44C 5/007; A44C 5/02; A44C 5/105; A44C 5/107; A44C 5/2023; A44C 5/2052; G04B 37/0008; A44B 11/2584; F16G 3/02; F41C 33/046; A41F 1/008
See application file for complete search history.

(56) References Cited

U.S. PATENT DOCUMENTS

| | | | | |
|---|---|---|---|---|
| 386,483 A * | 7/1888 | Mandell | ............... | A44B 11/008 267/73 |
| 4,608,838 A * | 9/1986 | Gardner | ............. | A44C 17/0216 63/40 |
| 5,152,443 A * | 10/1992 | Hagan | ........................ | A45F 5/02 224/904 |
| 5,669,117 A * | 9/1997 | Spina | ..................... | A44B 11/00 224/163 |
| 6,023,816 A * | 2/2000 | Okada | ....................... | A44C 5/24 24/71 J |
| 6,907,620 B2 * | 6/2005 | Sullivan-West | .... | A41D 13/0525 2/338 |
| 7,155,784 B1 * | 1/2007 | DeGroot | ................. | A41F 1/008 24/578.1 |
| 2014/0115756 A1 * | 5/2014 | Anderson | ............... | A41F 9/002 2/338 |

* cited by examiner

*Primary Examiner* — Victor D Batson
*Assistant Examiner* — Amber Nicole Helms
(74) *Attorney, Agent, or Firm* — Whitley Legal Group, P.C.; AnnMarie W. Whitley

(57) ABSTRACT

An outer belt for use with inner-outer belt systems includes a series of multiple belt links pivotally attached with roll pins. Each link supports hook or loop fasteners along the inner surface of the belt link and includes extensions having channels disposed therethrough to accept a roll pin when interlocked with extensions on an adjacent link. Serially connecting several belt links forms a belt, and opposite ends of the serially connected belt links attach to a catch link and an expandable buckle assembly. The expandable buckle assembly includes a face plate supporting two translatable connectors held biased together with a resilient member and cooperates with the catch link when the outer belt is worn by a shooter around his waist. Additionally, when a shooter is wearing an inner belt of an inner-outer belt system, the hook or loop fasteners secure the outer belt to the inner belt.

19 Claims, 6 Drawing Sheets

LINKED SHOOTING BELT

FIELD OF THE INVENTION

The present invention relates to firearms and more specifically to a novel and useful compactible linked belt for carrying holsters, pouches and accessories, and related gear.

BACKGROUND OF THE INVENTION

In addition to one or more firearms, competition shooters need extra magazines, ammunition, additional belt mounted accessories, and a belt or rig system on which to carry everything. Also known as a competition belt, speed belt, duty belt, or tactical belt, popular shooting belts include an inner-outer belt system having an inner belt that can be worn through the belt loops on the shooter's pants and a rigid outer belt that is stiff enough and strong enough to hold the shooter's holster, magazine carriers, and several pouches, which are usually securely attached to the outer belt with clamps or other fasteners. The rigidity of the outer belt is critical to keeping the gear in place and preventing wobbling, twisting, sagging, and shifting. The outer belt attaches to the under belt, usually with hook and loop connectors, but is not strung through belt loops on the shooter's pants. Accordingly, the outer belt can be quickly attached or removed to the under belt when the shooter is ready to go, and the holster, pouches, and other gear can remain permanently mounted to the outer belt in their fixed position. The two-belt system is widely used by competition shooters in particular for its strength, durability, mobility, and ease of configuration.

While popular among competition and other shooters, the commercially available outer belts for two-belt systems have several disadvantages. For example, to withstand the weight of the firearms, ammunition, and other gear, outer shooting belts are often formed of an outer webbing surrounding a continuous core of heavy duty polymer such as polyvinyl chloride (PVC) or high density polyethylene (HDPE) and an inner layer of hooks for hook and loop fasteners. Accordingly, the outer belt is bulky and rigid. It cannot be compacted, rolled, or otherwise reduced to a smaller form when not in use, making it cumbersome to store and carry. Additionally, because shooting belts must fit properly and because they are made of rigid and often bulky materials, they can be difficult to adjust or configure for a particular shooter and especially for a slim-waisted shooter. Accordingly, outer belts must be sold in many different sizes or be made to order. The stiffness of the belt also prevents it from following the contours of a shooter's waist such that it causes gapping and creates pressure points making it uncomfortable and leading to bruising when worn for several hours. Another disadvantage is that the ends of the outer belt often overlap to close the belt, which creates a large area where gear cannot be mounted. Consequently, to make the belt more useful, shooters often wear the belt so that it closes in the back, making it difficult to close. Finally, because the outer belt is made with a continuous core, if the core breaks or malfunctions anywhere along the belt, the entire outer belt must be replaced.

Given the drawbacks of outer belts for use with inner-outer belt systems, it would be desirable to have an adjustable and flexible outer belt that cooperates with existing inner belts while facilitating a better fit to the shooter's waist. It would be further desirable for the outer belt to allow for replacement of worn sections and for length customization to avoid having to replace it entirely. Additionally, it would be desirable for to have an outer belt that can be compacted or rolled into a smaller state for travel and storage while remaining rigid to prevent sagging or wobbling when worn by the shooter. Finally, it would be desirable to have an outer belt with a smaller buckle so that a shooter could comfortably wear the outer belt as intended without having to position the buckle at his back to create more room for gear. Such an outer belt would be a notable advance in the firearm and competitive shooting arts.

BRIEF SUMMARY OF THE INVENTION

In accordance with the present invention a novel and useful compactible and flexible outer belt for use with inner-outer belt systems is provided. The outer belt includes a series of multiple rigid and strong belt links pivotally attached with roll pins and a connected expandable buckle system. Each belt link includes an insert having hook or loop fasteners along the inner surface of the belt link, and the serially connected belt links attach at a first end to the buckle system catch and at a second end to an expandable buckle assembly. The expandable buckle assembly cooperates with the catch when the outer belt is worn by a shooter around his waist. Additionally, when a shooter is wearing an inner belt of an inner-outer belt system, the hook or loop fasteners secure the outer belt to the inner belt. Gear including holsters, magazine carrier, and pouches, can be secured on or around the belt links as they would be with a conventional outer belt design.

Each belt link includes a rigid link body that includes extensions on opposing ends where each extension includes a channel therethrough. The extensions of one link interlock with the extensions of an adjacent link, and the two adjacent links are pivotally held together with a roll pin inserted through the channels of the interlocked extensions. The roll pin allows for a pivotal connection between adjacent links, but the link body is configured to only allow adjacent links to lay flat or fold inward. Each link body further includes a link insert held within one or more recessed sections of the link body. Each link insert includes a section of hook or loop fasteners for cooperating with the hook or loop fasteners of an inner belt. Preferably, the fasteners are injection molded hooks that cover a substantial portion of the inner surface of each belt link.

When the links are serially connected, they have a first end that attaches to the catch and a second end that attaches to the expandable buckle assembly. The catch includes catch extensions that interlock with the link extensions of the belt link and are held together by a roll pin in the same manner as adjacent links are held together. The catch also has a connector bar for receiving hooks on the expandable buckle assembly. The expandable buckle assembly includes a buckle face plate having one or more guides made of rails with flanges along its lower surface, a first connector that translates along the face plate guides and includes hooks that cooperate with the catch, a second connector that also translates along the face plate guides and pivotally attaches to the second end of the series of connected belt links, and a resilient link anchored to the first and second connectors to hold them in tension. Both connectors have grooves and flanges formed in their upper surfaces that cooperate with the face plate guide rails and flanges, which holds the connectors in place while allowing them to slide between tighter and looser configurations. The first connector also includes grips positioned along its perimeter for the shooter to use when adjusting the belt or operating the buckle. The resilient link, which should provide enough movement to improve the fit of the overall outer belt and allow for easier fastening of the buckle, can be a silicone O-ring.

When fully assembled, the outer belt consists of the catch attached to the first end of several serially connected belt links and the expandable buckle assembly attached to the second end of the serially connected belt links. Each of the belt links, the catch, and the expandable buckle system can be separated and removed from other components of the outer belt by removing roll pins. Accordingly, if any part becomes worn or damaged or if a shooter needs to make his outer belt longer or shorter, he or she can easily do so by removing and replacing where desired individual links or the buckle system. Because the outer belt components can be easily removed and exchanged, a shooter can also customize his belt with different colored individual links and components. Additionally, because the buckle system expands, the buckle allows for additional adjustability to the length of the belt and allows for a tighter and more secure latch between the buckle and the catch.

The features and advantages of the present invention will be readily apparent to those skilled in the art upon a reading of the description of the exemplary embodiments, which follows.

For a better understanding of the invention reference is made to the following detailed description of the preferred embodiments of the invention which should be taken in conjunction with the above described drawings.

DETAILED DESCRIPTION OF THE INVENTION

Figure 1:
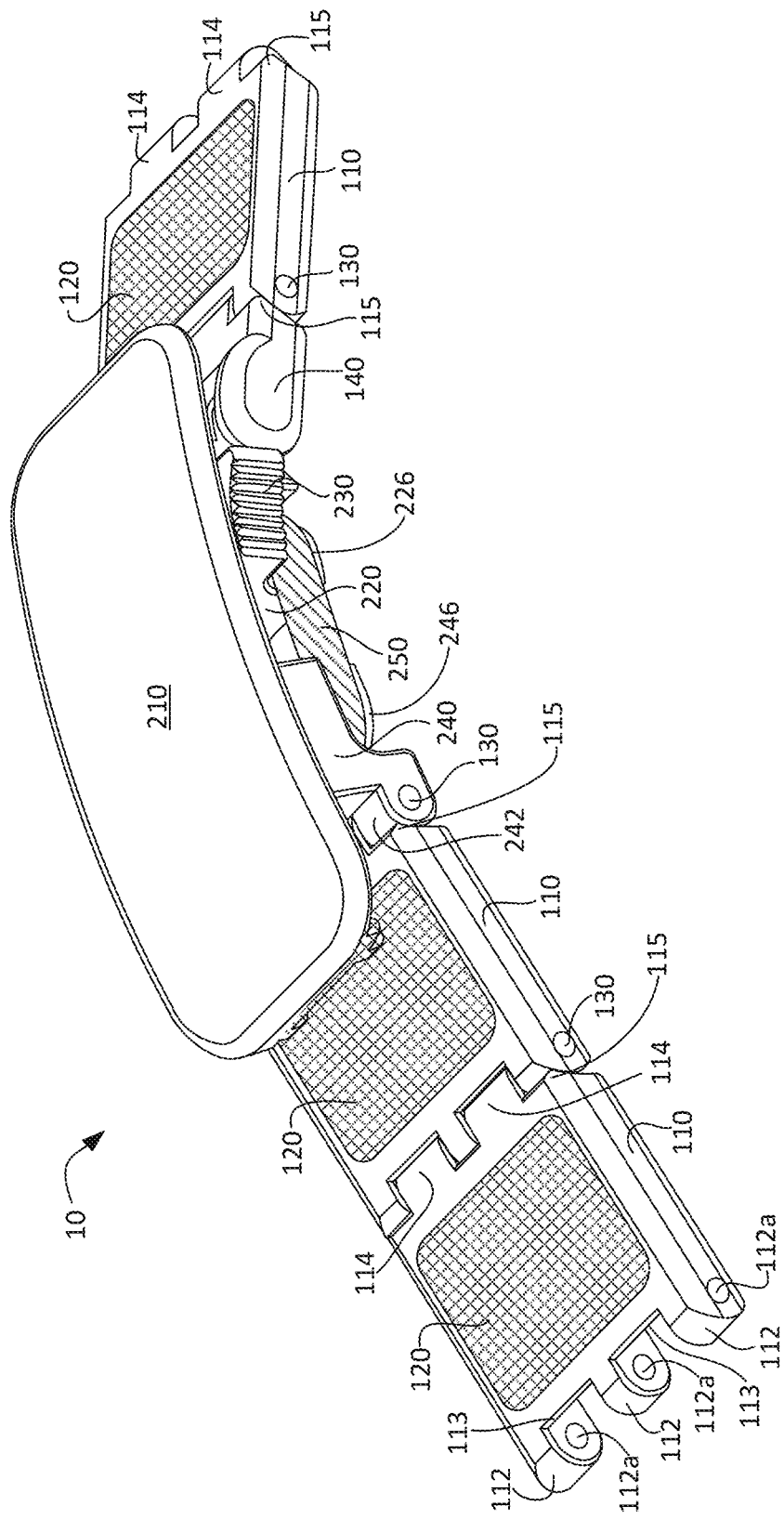
FIG. 1 is a perspective view of a preferred embodiment of the linked belt of the present invention.
Figure 2:
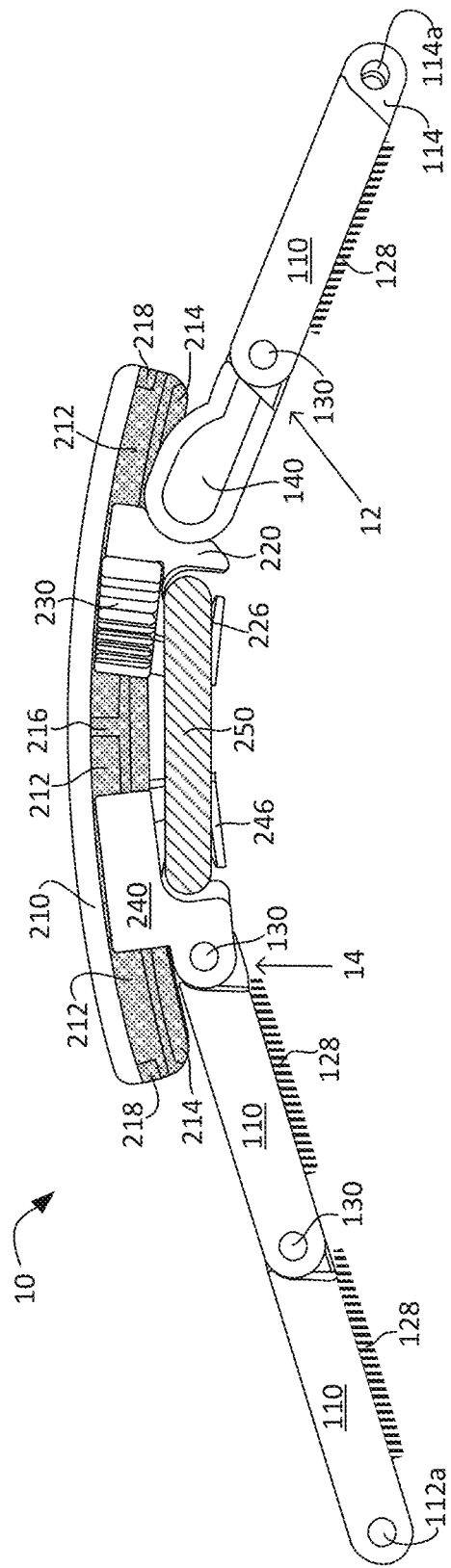
FIG. 2 is a first side view of the preferred embodiment of the linked belt of the present invention.
Figure 3:
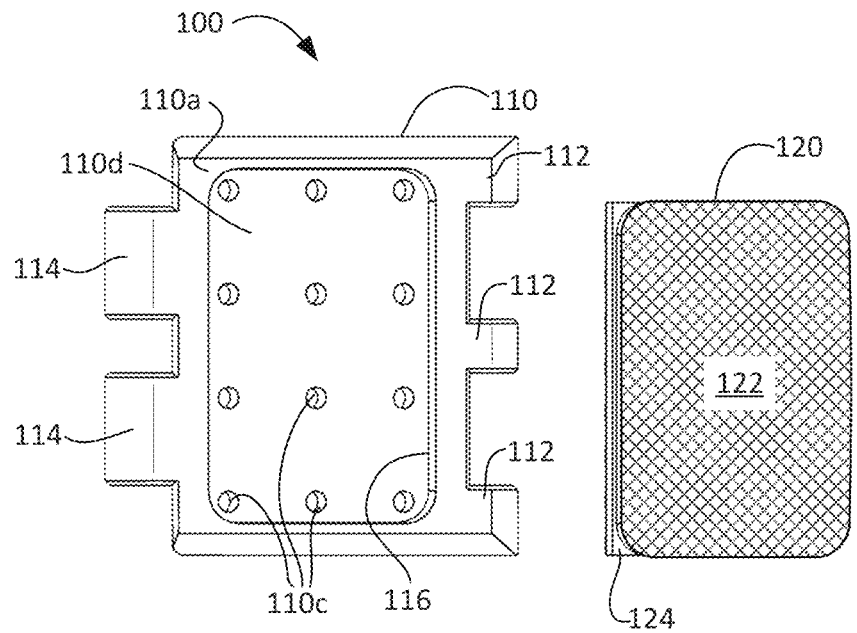
FIG. 3 is a top view of a link body and link insert of the preferred embodiment of the present invention.
Figure 4:
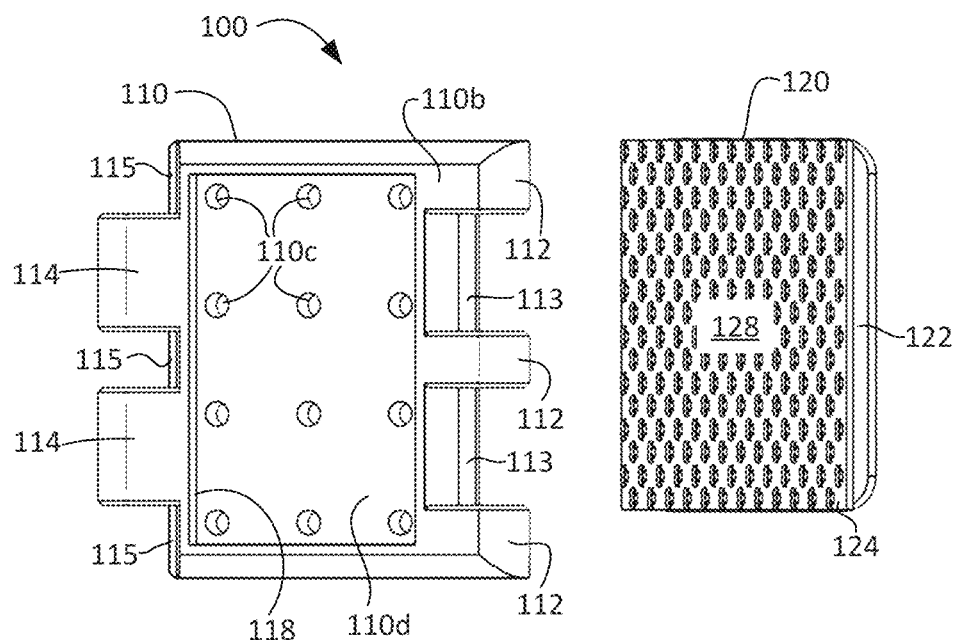
FIG. 4 is a bottom view of the link body and link insert of the preferred embodiment of the present invention.
Figure 5A:
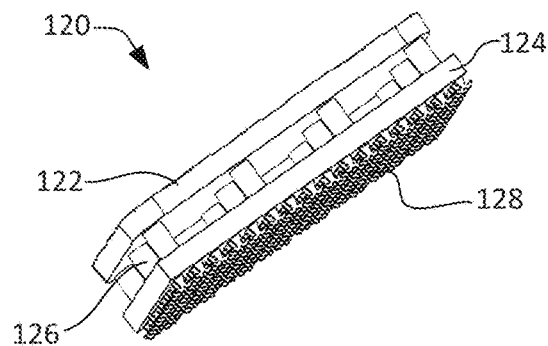
FIG. 5A is a perspective view of the link insert of the preferred embodiment of the present invention.
Figure 5B:
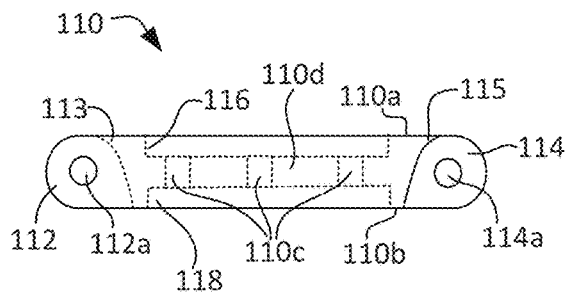
FIG. 5B is a side view of the link body of the preferred embodiment of the present invention.

The present invention, as shown in FIGS. 1-10, relates to a novel and useful outer belt 10 for use with inner-outer style shooting belts, firearms, and related gear. FIGS. 1-2 illustrate the overall assembly of outer belt 10, and FIGS. 3-6 illustrate the belt links 100 of outer belt 10. FIGS. 7-10 illustrate the expandable buckle system 200 and components thereof, including the expandable buckle assembly 201 and catch 140. When several belt links 100 are serially connected, together with the buckle system 200, they form the outer belt 10. The overall thickness of links 100 and accordingly most of the belt 10 as a whole is preferably optimized to accommodate commercially available holsters, magazine holders, and other gear ordinarily attachable to shooting belts with clamps or other means. Additionally, the components of outer belt 10 in general are preferably made from materials rigid and strong enough to support a shooters gear when held by outer belt 10.

As shown in FIGS. 1-6, outer belt 10 includes a series of rigid belt links 100 pivotally attached with roll pins 130. Each belt link 100 includes a link body 110 and an insert 120 having hook or loop fasteners 128 that align with the inner surface 110b of the link body 110 and belt link 100. Preferably, link body is made from Polyamide 66, or Nylon 66 (PA66), an engineering-grade thermoplastic, with 25% glass fiber or any material rigid and strong enough to accommodate supporting firearms and related gear. Link insert 120 is preferably made from injection molded plastics including at least a portion of which is a hook fastener made of Polypropylene, Polyethylene, Polyacetal (POM), polyamide, and other thermoplastic elastomers as is further discussed below. More preferably, link insert 120 is made from a nylon such as Zytel® 101L from DuPont de Nemours, Inc. of Wilmington, Del. Link body 110 can be a single or integral component molded in the desired shape or multiple components attached or adhered together. Likewise, link insert 120 can be single or integral components molded in the desired shape or multiple components attached or adhered together. Preferably, link insert 120 is made of integral segments that are injection molded over link body 110.

Figure 6:
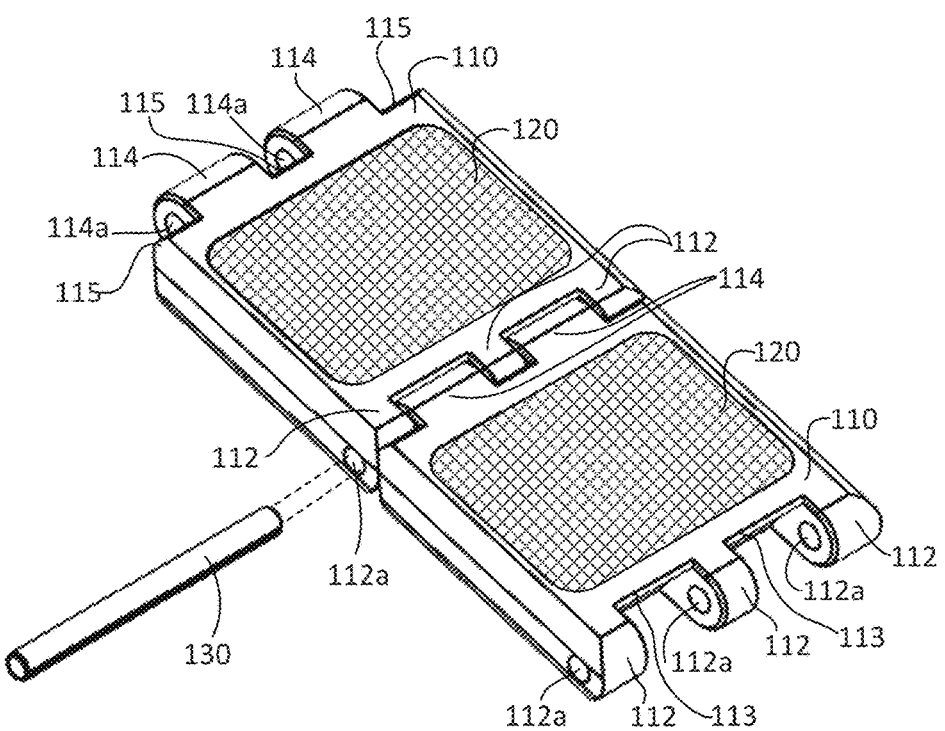
FIG. 6 an exploded view of two-belt links and a roll pin according to the preferred embodiment of the present invention.

FIGS. 3-5B illustrate the link body 110 and link insert 120 in detail. As shown, link body 110 includes first link extensions 112 and second link extensions 114 on opposing first and second ends of link body 110. Each first link extension 112 defines a first link channel 112a therethrough, and each second link extension 114 defines a second link channel 114a therethrough. The channels 112a and 114a are oriented such that when first link extensions 112 on one link 100 interlock with second link extensions 114 on an adjacent link 100, the channels 112a and 114a align to form a larger channel that can accommodate roll pin 130, which will pivotally hold the links 100 together. FIGS. 1-2 and 6 illustrate how roll pin 130, link extensions 112 and 114, and link channels 112a and 114a cooperate. Preferably, there are three first link extensions 112 and two second link extensions 114.

Optionally, near link extensions 112 and 114 link body 110 may also include stopper flanges 113 and 115 to limit the amount of pivot allowed between links. First stopper flanges 113, as shown in the Figures, extend along the edge of link body 110 between and adjacent to first link extensions 112 along the top surface 110a of link body 110. Similarly, second stopper flanges 115 extend along the edge of link body 110 between and adjacent to second link extensions 114 along the top surface 110a of link body 110. The arrangement of link extensions and stopper flanges allows the links to pivot relative to each other so that they can be laid flat or fold inward while preventing them from folding outward.

Preferably, link body 110 also includes one or more recessed sections for holding and housing at least one link insert 120. Preferably, link body 110 defines an upper recessed section 116 along its upper or outer surface 110a, a lower recessed section 118 along its lower or inner surface 110b, and a plurality of openings 110c through a center section 110d that connect the upper recessed section 116 to the lower recessed section 118. Recessed sections 116 and 118 are preferably sized to cooperate with link inserts 120 as shown in the Figures and to secure link inserts 120 within link body 110. As also shown in the Figures, link body preferably defines twelve openings 110c through center section 110d, which facilitates the overmolding process preferably used to form link insert 120.

Link insert 120 can be a single insert or multiple cooperating or connected inserts. Preferably and as shown in the Figures, link insert 120 includes an upper insert section 122, a lower insert section 124 having hook or loop fasteners 128, and a plurality of pillars 126 extending from the lower insert section 124 to the upper insert section 122. The pillars 126 are configured to fit within the openings 110c in the link body 110 thereby further securing the link insert 120 to the link body 110. Preferably, upper insert section 122 is configured to fit in upper recessed section 116 of link body 110, and lower insert section 124 is configured to fit in lower recessed section 118 of link body 110. Integral with or attached to the lower insert section 124 is one part of a hook and loop fastener 128. Preferably, and as shown, fastener 128 is a collection of hooks that cooperates with loops of hook and loop fasteners, and fastener 128 entirely covers the surface of lower insert section 124. By having fastener 128 be a collection of hooks, when outer belt 10 is fully assembled, it can easily attach to inner belts of inner-outer shooting belt systems, most of which are made from the loop portion of hook and loop fasteners. More preferably, fastener 128 is an injection molded hook portion of hook and loop fastener such as Intermold® from Aplix Group of Le Cellier, France. Link insert 120 is preferable at least partly made from injection molded Polypropylene, Polyethylene, Polyacetal (POM), polyamide, and other thermoplastic elastomers.

Several links 100 can be removably attached together with spring pins, tension pins, or roll pins 130 to form outer belt 10. Importantly, links should be oriented so that fastener 128 on each link is facing inward. Roll pins 130 are preferably comprised of steel of stainless steel and are sized and configured to fit within link channels 112a and 114a when the pins 130 are slightly compressed and to extend from edge to edge of the link as shown in the Figures. Once cooperating link extensions 112 and 114 of adjacent links 100 are interlocked so that link channels 112a and 114a align, roll pin 130 can be inserted by hammering or tapping them in. Preferably the pin 130 fits securely within the channels 112a and 114a yet while allowing the links 100 to easily rotate about roll pin 130. By using roll pins 130, the overall rigidity of outer belt 10 is enhanced and additional components are not needed to facilitate attachment between individual links. The tight fit of each roll pin 130 is maintained due to the outward force it exerts on the channels 112a and 114a. To adjust the length of outer belt 10, belt links 100 can be added or removed simply by inserting and removing roll pins 130. Once the desired number of belt links 100 are connected to form outer belt 10, the serially connected links 100 have a first end 12 and a second end 14 as shown in FIG. 2, and the buckle system 200 can be added.

Figure 7:
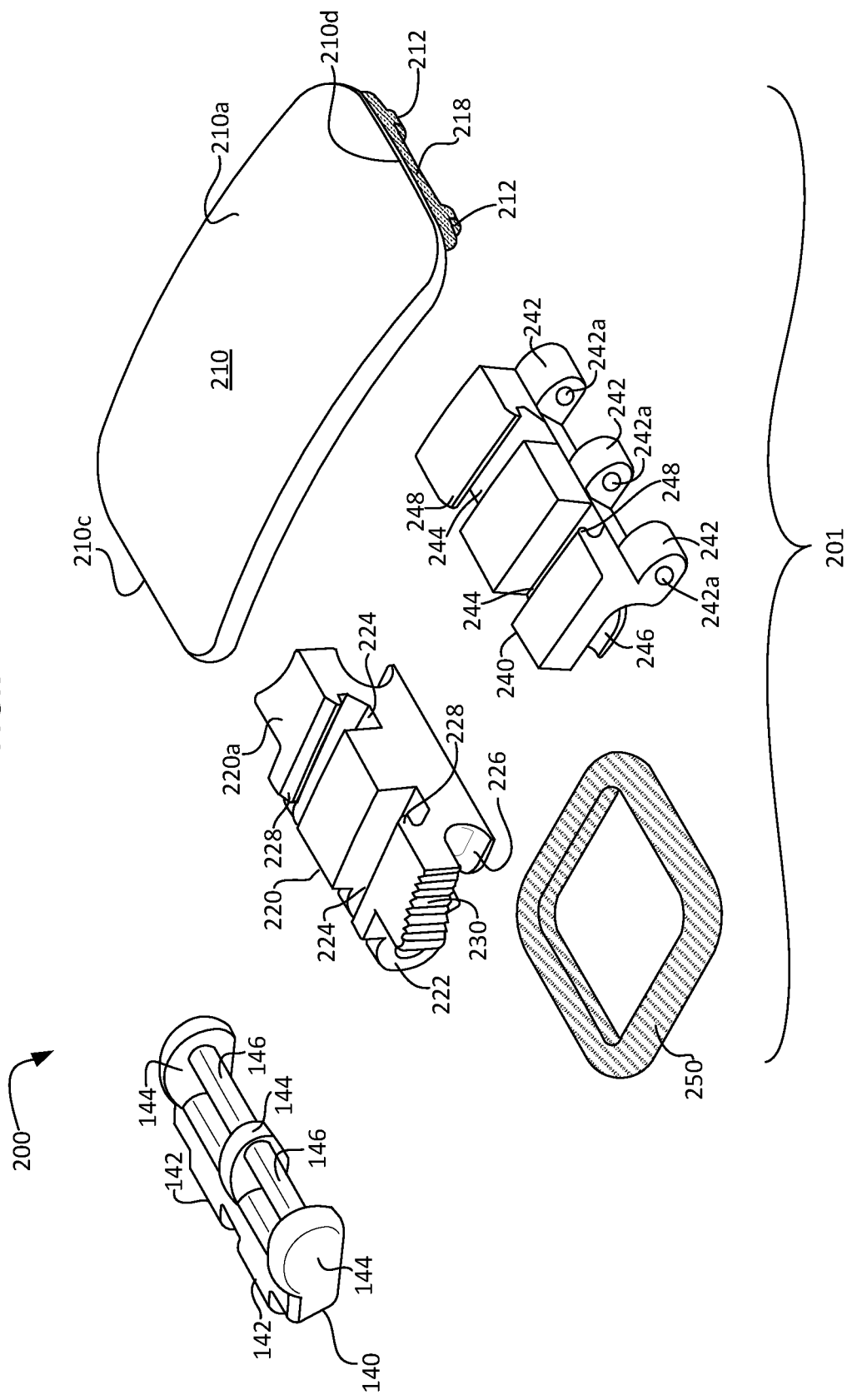
FIG. 7 is a perspective view of the components of a preferred embodiment of the expandable buckle system according to the present invention.
Figure 8:
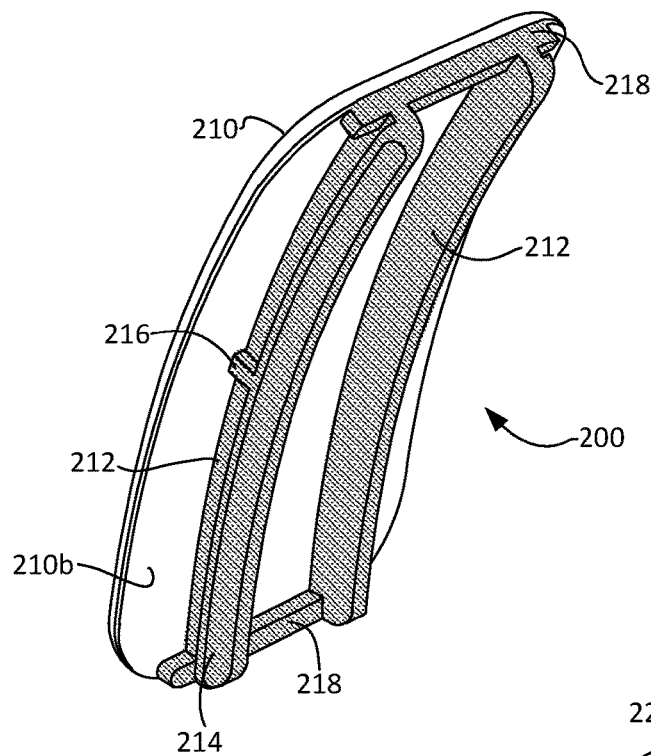
FIG. 8 is a perspective view of the bottom of a preferred embodiment of the expandable buckle assembly face plate according to the present invention.
Figure 9:
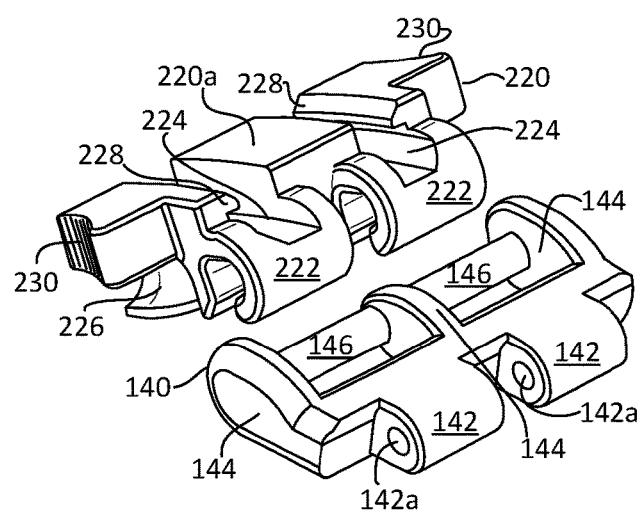
FIG. 9 is a perspective view of the catch and first connector of the expandable buckle assembly of the present invention.

FIG. 7 illustrates the components of buckle system 200. As shown, buckle system 200 includes a catch 140, which attaches to the first end 12 of the serially connected belt links 100, and an expandable buckle assembly 201, which connects to the second end 14 of the serially connected belt links 100. Expandable buckle assembly 201 includes a face plate 210, a first connector 220 slidably connected to the face plate 210, a second connector 240 slidably connected to the face plate 210, and a resilient link 250 holding first connector 220 and second connector 240 together in tension.

The catch 140 links or attaches to the first end 12 of several serially connected belt links 100 and includes first catch extensions 142 that define catch channels 142a. First catch extensions 142 are sized and configured to interlock with the first link extensions 112 of the belt link 100. Like two connected belt links 100, the catch 140 and an adjacent belt link 100 are pivotally held together with a roll pin 130 inserted through a channel formed by the interlocking first catch extensions 142 and first link extensions 112 and their aligned respective channels 142a and 112a. On its end opposite first catch extensions 142, catch 140 also includes second catch extensions 144 supporting a connector bar 146. Preferably three second catch extensions 144 support two connector bars 146 or a continuous connector bar 146 that extends through and among the three catch extensions 144. Connector bar 146 is held at a spaced distance from the body of the catch 140 so that it can cooperate with hooks 222 on the first connector 220 of expandable buckle assembly 201. As with belt links 100, catch 140 is preferably comprised of a material rigid and strong enough to accommodate supporting firearms and related gear such as PA66 with 25% glass fiber and optionally some toughener and can be a single or integral component or several components attached or adhered together.

The expandable buckle assembly 201 cooperates with catch 140 when the outer belt 10 is worn by a shooter around his waist. As described above, it includes a face plate 210, a first connector 220 slidably connected to the face plate 210, a second connector 240 slidably connected to the face plate 210, and a resilient link 250 holding first connector 220 and second connector 240 together in tension. The face plate 210 has an outer or upper surface 210a and an inner or lower surface 210b. Along the lower surface 210b, face plate includes one or more guides, which each include rails 212 and rail flanges 214. Preferably, face plate 210 includes two parallel guides where each rail 212 and rail flange 214 preferably extends from a first end 210c to a second end 210d of face plate 210 and includes a center divider 216. At or along each end 210c and 210d of face plate 210 and descending from the lower surface 210b of face plate, are bumpers 218. Bumpers 218, rails 212 and flanges 214, and dividers 216 cooperate to guide and hold buckle connectors 220 and 240 to the underside of face plate 210 such that each connector can slide or translate along rails 212 between the divider 216 and a bumper 218. Face plate can be comprised of PA66 with 25% glass fiber or any material rigid and strong enough to accommodate supporting firearms and related gear and can be a single or integral component or several individual components attached or adhered together.

Figure 10:
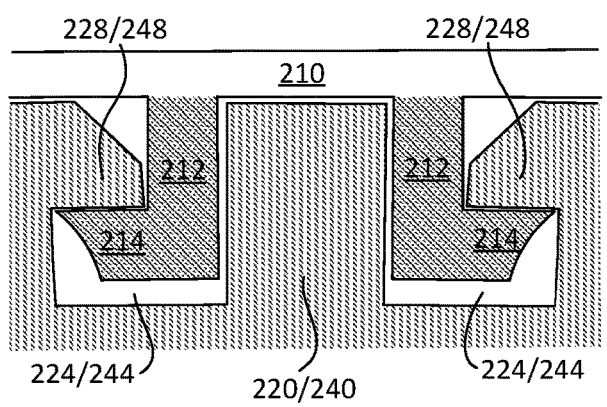
FIG. 10 is an illustration of how the grooves of the connectors 220 and 240 and the rails of the face plate interlock according to the present invention.

First connector 220 of expandable buckle assembly 201 connects to and translates or slides along rails 212 of face plate 210 near its first end 210c. The first connector includes grooves 224 and first groove flanges 228 along its upper surface 220a that are configured to interlock with and descend from the rails 212 and rail flanges 214 as illustrated in FIG. 10. The number of grooves 224 on first connector 220 will correspond to the number of rails 212 on face plate 210, which is preferably two parallel grooves 224 cooperating with two parallel rails 212. First connector 220 also includes hooks 222 that cooperate with the connector bars 146 of catch 140. Preferably, connector 220 has two hooks 222 that removably catch on or hook over two connector bars 146. Additionally, connector 220 can include optional grips 230 positioned along its perimeter as shown in the Figures to provide a secure spot onto which the shooter can hold the buckle assembly 201 when hooking or unhooking hooks 222 from connector bars 146. Connector 220 further includes a connection, structure, anchor, or other feature that allows for attachment to a resilient link 250. Preferably, as shown, connector 220 includes an O-ring anchor 226 extending from its lower surface. The anchor 226 includes a contoured surface around which a portion of O-ring 250 can be held in place. First connector 220 can be comprised of PA66 with 25% glass fiber or any material rigid and strong enough to accommodate supporting firearms and related gear and can be a single or integral component or several individual components attached or adhered together.

Like the first connector 220 of expandable buckle assembly 201, the second connector 240 includes grooves 244 and groove flanges 248 that are configured to interlock with, translate or slide along, and descend from the rails 212 and rail flanges 214 on the lower surface 210b of the face plate 210. The number of grooves 244 on second connector 240 will correspond to the number of rails 212 on face plate 210, which is preferably two parallel grooves 244 cooperating with two parallel rails 212. The second connector also includes a connection, structure, anchor, or other feature that allows for attachment to a resilient link 250. Preferably, as shown, connector 240 includes an O-ring anchor 246 extending from its lower surface. The anchor 246 includes a contoured surface around which a portion of O-ring 250 can be held in place. Second connector 240 also includes first connector extensions 242 defining channels 242a therethrough that cooperate with the second link extensions 114 of the belt link 100 at the second end 14 of the series of connected belt links. In the same manner as the links 100 are pivotally connected, the second belt link extensions 114 and first connector extensions 242 are pivotally connected with a roll pin 130 inserted through the continuous channel formed by the interlocking first connector extensions 242 and second link extensions 114 and their respective aligned channels 242a and 114a. Second connector 240 can be comprised of PA66 with 25% glass fiber or any material rigid and strong enough to accommodate supporting firearms and related gear and can be a single or integral component or several individual components attached or adhered together.

When first and second connectors 220 and 240 are positioned such that their respective grooves 224 and 244 and groove flanges 228 and 248 are interlocked on rails 212 and with rail flanges 214 of face plate 210, they are held adjacent one another and preferably such that resilient link 250 directly connects first connector 220 and second connector 240 in tension together. As shown in the Figures, resilient link 250 is a silicone O-ring that extends between and around first connector anchor 226 and second connector anchor 246. While an O-ring is illustrated in the Figures and preferred, other types of resilient links can be used as long as they bias connectors 220 and 240 toward each other. For example, resilient link 250 could be an arrangement of one or more springs or an arrangement of elastic bands. Because connectors 220 and 240 can translate or slide along face plate 210 and are connected with resilient link 250, the assembly 201 allows for additional expansion of outer belt 10 when the shooter is wearing it and when the shooter is hooking or unhooking first connector 220 to or from catch 140.

When fully assembled, outer belt 10 consists of the catch 140 attached to the first end 12 of several serially connected belt links 100 and the expandable buckle assembly 201 attached to the second end 14 of the serially connected belt links. Each of the belt links 100, the catch 140, and the expandable buckle assembly 201 can be separated and removed from the other components of outer belt 10 by removing one or more roll pins 130. Accordingly, if any part of outer belt 10 becomes worn or damaged or if a shooter needs to make outer belt 10 longer or shorter, he or she can easily do so by removing and replacing individual links 100 or components of the buckle system 200. Additionally, because the buckle system 200 and its buckle assembly 201 expand, the buckle system 200 allows for additional adjustability to the length of the belt and allows for a tighter and more secure latch between the buckle assembly 201 and the catch 140. Moreover, because the links 100 each have hook or loop fastener 128 on their inner surface, outer belt 10 easily secures to an inner belt of cooperating hook or loop fastener. Finally, because belt links 100 have a thickness and strength similar to traditional outer belts of inner-outer shooting belt systems, firearms and gear can be attached along links 100 with clamps or other conventional methods of attaching firearms and gear to belts. Unlike conventional outer belts, however, when the outer belt 10 described herein is removed for travel or storage, it can be compacted or rolled into a smaller shape due to the pivotal connection between individual links 100.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

I claim:
1. A linked outer belt of an inner-outer shooting belt system comprising:
   a) a plurality of belt links pivotally connected in series, wherein the combined connected belt links have a first end and a second end and wherein each belt link comprises:
      i) a rigid link body comprising an outer surface, an inner surface, a first end, and a second end, wherein the first end of each link body is configured to pivotally connect with the second end of an adjacent link body; and
      ii) a link insert attached to the link body at the link body inner surface between the first and second ends of the link body, wherein the link insert comprises a hook and loop fastener component; and
   b) a buckle system comprising:
      i) a catch pivotally attached to the first end of the serially connected belt links; and
      ii) an expandable buckle assembly pivotally attached to the second end of the serially connected belt links, wherein the expandable buckle assembly comprises a buckle hook that removably attaches to the catch; a face plate comprising a lower surface, a first end, a second end, and a guide disposed along the lower surface from the first end to the second end; a first connector slidably disposed on the face plate guide near the first end of the face plate, wherein the first connector comprises the buckle hook that removably attaches to the catch; a second connector slidably disposed on the face plate guide near the second end of the face plate, wherein second connector pivotally attaches to the second end of the serially connected belt links; and a resilient link connecting the first connector to the second connector.

2. The linked belt of claim 1 wherein the first connector further comprises a first anchor, the second connector comprises a second anchor, and the resilient link comprises an O-ring attached to the first anchor and second anchor.

3. The linked belt of claim 1 wherein the expandable buckle assembly first connector further comprises a grip along a perimeter of the first connector.

4. The linked belt of claim 1 further comprising a plurality of roll pins, wherein the first end of a link body defines a first extension channel and is configured to interlock with the second end of an adjacent belt link body with one of the plurality of roll pins and wherein the second end of the link body defines a second extension channel and is configured to interlock with the first end of an adjacent belt link body with one of the plurality of roll pins.

5. The linked belt of claim 4 wherein the catch defines catch channels, the catch pivotally attaches to the first end of the serially connected belt links with one of the plurality of roll pins disposed in the catch channels and first extension channels of the link body, the second connector defines connector channels, and the connector pivotally attaches to the second end of the serially connected belt links with one of the plurality of roll pins disposed in the connector channels and second extension channels of the link body.

6. The linked belt of claim 5 wherein the link body of each belt link further comprises:
   a) first extensions integral with and extending from the first end of the link body, wherein the first extensions define the first extension channels; and
   b) second extensions integral with and extending from the second end of the link body, wherein the second extensions define the first second extension channels.

7. The linked belt of claim 6 wherein the link body of each belt link further comprises:
   a) a first stopper flange along the link body outer surface at the link body first end between individual first extensions; and
   b) a second stopper flange along the link body outer surface at the link body second end between individual second extensions.

8. The linked belt of claim 7 wherein the link insert hook and loop fastener component comprises a plurality of injection molded hooks configured to cooperate with hook and loop fastener loops.

9. A linked outer belt of an inner-outer shooting belt system comprising:
   a) a plurality of belt links pivotally connected in series, wherein the combined connected belt links have a first end and a second end and wherein each belt link comprises:
      i) a rigid link body comprising an outer surface, a first recessed section along the outer surface, an inner surface, a second recessed section along the inner surface, a center section defining a plurality of openings disposed between the first and second recessed sections, a first end, and a second end, wherein the first end of each link body is configured to pivotally connect with the second end of an adjacent link body;
      ii) a plurality of roll pins, wherein each roll pin pivotally connects the first end of a link body to the second end of an adjacent link body; and
      iii) a link insert attached to the link body at the link body inner surface between the first and second ends of the link body, wherein the link insert comprises a hook and loop fastener component and fits within the first and second recessed sections and plurality of openings; and
   b) a buckle system comprising:
      i) a catch pivotally attached to the first end of the serially connected belt links; and
      ii) an expandable buckle assembly pivotally attached to the second end of the serially connected belt links, wherein the expandable buckle assembly comprises a buckle hook that removably attaches to the catch.

10. The linked belt of claim 9 wherein the link body of each belt link further comprises:
    a) first extensions integral with and extending from the first end of the link body, wherein each first extension defines a first extension channel and is configured to interlock with the second end of an adjacent belt link body and to accommodate one of the plurality of roll pins; and
    b) second extensions integral with and extending from the second end of the link body, wherein each second extension defines a second extension channel and is configured to interlock with the first end of an adjacent belt link body and to accommodate one of the plurality of roll pins.

11. The linked belt of claim 10 wherein the link body of each belt link further comprises:
    a) a first stopper flange along the link body outer surface at the link body first end between individual first extensions; and
    b) a second stopper flange along the link body outer surface at the link body second end between individual second extensions.

12. The linked belt of claim 11 wherein the link insert hook and loop fastener component comprises a collection of injection molded hooks configured to cooperate with hook and loop fastener loops.

13. A linked outer belt of an inner-outer shooting belt system comprising:
    a) a plurality of belt links pivotally connected in series, wherein the combined connected belt links have a first end and a second end and wherein each belt link comprises:
       i) a rigid link body comprising an outer surface, a first recessed section along the outer surface, an inner surface, a second recessed section along the inner surface, a center section defining a plurality of openings disposed between the first and second recessed sections, a first end, and a second end, wherein the first end of each link body is configured to pivotally connect with the second end of an adjacent link body; and
       ii) a link insert attached to the link body at the link body inner surface between the first and second ends of the link body, wherein the link insert comprises a hook and loop fastener component and fits within the first and second recessed sections and plurality of openings; and
    b) a buckle system comprising:
       i) a catch pivotally attached to the first end of the serially connected belt links; and
       ii) an expandable buckle assembly pivotally attached to the second end of the serially connected belt links, wherein the expandable buckle assembly comprises a buckle hook that removably attaches to the catch.

14. The linked belt of claim 13 wherein the link insert of each belt link further comprises an upper insert section that cooperates with first recessed section of the link body, a lower insert section that cooperates with second recessed section of the link body, and a plurality of pillars extending from and integrally connected with the lower insert section and upper insert section, wherein each pillar of the plurality of pillars extends through an opening of the plurality of openings in the center section of the link body.

15. The linked belt of claim 13 wherein the link insert hook and loop fastener component comprises a plurality of injection molded hooks configured to cooperate with hook and loop fastener loops.

16. The linked belt of claim 14 wherein the link insert hook and loop fastener component comprises a plurality of injection molded hooks configured to cooperate with hook and loop fastener loops.

17. A linked belt comprising:
a) a plurality of belt links serially connected, wherein the serially connected belt links have a first end and a second end and wherein each belt link comprises:
 i) a rigid link body having an outer surface and an inner surface, a first end, and a second end, the link body comprising:
  1) at least two first extensions integral with and extending from the first end of the link body, wherein each first extension defines a first extension channel;
  2) a first stopper flange disposed along the outer surface of the link body at the link body first end between individual first extensions;
  3) At least two second extensions integral with and extending from the second end of the link body, wherein each second extension defines a second extension channel and wherein the second extensions and first extensions are configured to interlock such that the first extension channels and second extension channels align; and
  4) a second stopper flange disposed along the outer surface of the link body at the link body second end between individual second extensions; and
 ii) a link insert attached to the link body between the first and second ends of the link body and at the link body inner surface wherein the link insert comprises a hook and loop fastener component;
b) a plurality of roll pins configured to attach the first end of a belt link body to the second end of an adjacent belt link body wherein at each connection one of the plurality of roll pins is disposed through the aligned first extension channels and the second extension channels of the interlocking first and second ends of the adjacent belt link bodies; and
c) a buckle system comprising:
 i) a catch pivotally connected to the first end of the serially connected belt links comprising a connector bar; and
 ii) an expandable buckle assembly attached to the second end of the serially connected belt links, wherein the expandable buckle assembly comprises:
  1) a face plate comprising a lower surface, a first end, a second end, and a guide disposed along the lower surface from the first end to the second end;
  2) a first connector slidably disposed on the face plate guide near the first end of the face plate, wherein the first connector comprises a buckle hook that removably attaches to the catch connector bar;
  3) a second connector slidably disposed on the face plate guide near the second end of the face plate, wherein second connector pivotally attaches to the second end of the serially connected belt links; and
  4) A resilient link connecting the first connector to the second connector.

18. The linked belt of claim 17 wherein:
a) the link body of each belt link further comprises a first recessed section along the link body outer surface, a second recessed section along the link body inner surface, and a center section defining a plurality of openings disposed between the first and second recessed sections; and
b) the link insert of each belt link further comprises an upper insert section that cooperates the first recessed section of the link body, a lower insert section that cooperates with second recessed section of the link body and comprises a collection of injection molded hooks configured to cooperate with hook and loop fastener loops, and a plurality of pillars extending from and integrally connected with the lower insert section and upper insert section, wherein each pillar of the plurality of pillars extends through an opening of the plurality of openings in the center section of the link body.

19. The linked belt of claim 17 wherein the first connector further comprises a first anchor, the second connector comprises a second anchor, and the resilient link comprises an O-ring attached to the first anchor and the second anchor.

* * * * *